US012774705B2

(12) United States Patent
Feyrer et al.

(10) Patent No.: US 12,774,705 B2
(45) Date of Patent: Oct. 27, 2026

(54) MIXING CHAMBER FOR GENERATING A PUMP CHARGE

(71) Applicant: ZF Friedrichshafen AG, Friedrichshafen (DE)

(72) Inventors: Bastian Feyrer, Meckenbeuren (DE); Horst Leichsenring, Friedrichshafen (DE); Paolo Ruatto, Eriskirch (DE); Norbert Braun, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/949,015

(22) Filed: Nov. 15, 2024

(65) Prior Publication Data

US 2025/0163913 A1 May 22, 2025

(30) Foreign Application Priority Data

Nov. 17, 2023 (DE) ..................... 10 2023 211 438.0

(51) Int. Cl.
*F04C 15/06* (2006.01)
*F01M 1/02* (2006.01)
(Continued)

(52) U.S. Cl.
CPC ............ *F04C 15/062* (2013.01); *F04F 5/463* (2013.01); *F01M 1/02* (2013.01);
(Continued)

(58) Field of Classification Search
CPC .............. F04C 15/062; F04C 2250/101; F04C 2250/102; F01M 1/02; F04F 5/46; F04F 5/463; F16H 57/0434
See application file for complete search history.

(56) References Cited

U.S. PATENT DOCUMENTS 5,147,183 A * 9/1992 Gettel ................. F01C 21/0863 417/300
5,496,152 A * 3/1996 Heise .................... F04C 15/062 417/189
(Continued)

FOREIGN PATENT DOCUMENTS

DE 10 2016 121 537 5/2017
DE 102016121537 A1 * 5/2017 ............. F02M 26/19
(Continued)

OTHER PUBLICATIONS

German Patent Office, Search Report issued in German Patent application No. 10 2023 211 438.0 (Aug. 26, 2024).

*Primary Examiner* — Alexander B Comley
(74) *Attorney, Agent, or Firm* — Secant IP, P.L.L.C.

(57) ABSTRACT

A mixing chamber for generating a pump charge in a fluid pump has an inner wall defining an inside space. A suction inlet is configured to be connected to a fluid source from which it draws a fluid. A charging inlet is configured to admit a fluid stream into the inside space and thereby to generate the pump charge. An outlet from the inside space is configured to let the fluid in the inside space out of the mixing chamber. The charging inlet includes a first fluid-guiding section configured as a confuser, a second fluid-guiding section in the form of a constriction, and a third fluid-guiding section configured as a diffuser. The constriction is located between the confuser and the diffuser and has the smallest diameter within the charging inlet. The diffuser is formed by an inclined side surface.

9 Claims, 4 Drawing Sheets

(51) Int. Cl.
*F04F 5/46* (2006.01)
*F16H 57/04* (2010.01)

(52) U.S. Cl.
CPC .. *F04C 2250/101* (2013.01); *F04C 2250/102* (2013.01); *F04F 5/46* (2013.01); *F16H 57/0434* (2013.01)

(56) References Cited

U.S. PATENT DOCUMENTS

| | | | | |
|---|---|---|---|---|
| 6,287,094 | B1 * | 9/2001 | Bleitz | F04C 15/062 417/440 |
| 9,845,802 | B2 | 12/2017 | Ruatto et al. | |
| 2008/0308352 | A1 * | 12/2008 | Form | F16H 57/0434 184/6 |

FOREIGN PATENT DOCUMENTS

| | | | | |
|---|---|---|---|---|
| DE | 10 2016 202 302 | | 8/2017 | |
| DE | 10 2021 211 785 | A1 | 4/2023 | |
| DE | 102021214356 | A1 * | 6/2023 | F16H 61/48 |
| JP | 2008-93515 | | 4/2008 | |
| WO | WO-2004007966 | A1 * | 1/2004 | F04C 2/3446 |
| WO | WO-2015055218 | A1 * | 4/2015 | F04F 5/46 |

* cited by examiner

MIXING CHAMBER FOR GENERATING A PUMP CHARGE

RELATED APPLICATIONS

This application claims the benefit of and right of priority under 35 U.S.C. § 119 to German Patent Application no. 10 2023 211 438.0 filed on 17 Nov. 2023, the contents of which are incorporated herein by reference in its entirety.

FIELD OF THE DISCLOSURE

The invention relates to a mixing chamber for producing a pump charge in a fluid pump. In addition, the invention relates to a pump device with a fluid pump and a mixing chamber of the type.

BACKGROUND

The concept of pump charging for a fluid pump is known. In pump charging the suction flow leading to a fluid pump passes through a mixing chamber upstream from the pump. In the mixing chamber there is a nozzle through which an additional charging flow is supplied to the suction flow. The charging flow adds kinetic energy to the suction flow, which drives the fluid flow in the mixing chamber in the direction toward the fluid pump. In that way the amount of fluid that can be conveyed by the fluid pump can be increased. Further, the energy required by the fluid pump for conveying the fluid can be reduced.

Pump charging is preferably used in pumps with which the quantity delivered depends only on the rotation speed, as is the case with ordinary vane pumps. In such cases it can happen that, on the one hand the quantity delivered by the pump is more than is actually needed, while on the other hand the pump rotation speed cannot be simply reduced. This, for example, happens with mechanically driven vane pumps, in particular with hydraulic pumps of vehicle transmissions. Instead of the excess fluid then delivered from the pump outlet being passed back into a fluid reservoir, at least some of it is used as the charging flow for the pump charging. The energy required by the pump for conveying the fluid is in that way reduced by the pump charging.

Hydraulic pumps, such as hydraulic vane pumps, have a tendency toward cavitation if the minimum inlet pressure in the pump inlet is lower than the vapor pressure of the conveyed medium or the dissolved air. This happens as a rule at high rotation speeds. Cavitation is the local expulsion of air from the medium or vaporization of the medium in the low-pressure range and the subsequent collapse of the resulting gas bubbles in areas where the pressure is higher. This effect can result in damage to components and in undesired noise. In transmission technology hydraulic oil pumps are often connected to the motor rotation speed by way of a gear ratio. Owing to a high oil demand even at low motor rotation speeds, a fixed gear ratio larger than one is chosen. The result is that at low motor rotation speeds the supply of oil to the transmission is improved. However, at high motor rotation speeds the fixed gear ratio greater than one also results in high pump rotation speeds. High pump rotation speeds increase the risk of cavitation in the pump. To improve that behavior, as a rule the excess oil not used in the consumer is fed back into the pump.

From disclosure document DE 10 2007 027 222 A1 a connection arrangement for connection to a suction side of an oil pump in a housing of a vehicle transmission is known, wherein a separate suction manifold with an integrated suction charger is provided.

From disclosure document DE 10 2011 084 405 A1 a suction-charged pump for conveying a fluid is known. In this case an essentially cylindrical mixing chamber is provided, in which a suction stream can be fed into the pump. Into the mixing chamber there opens a nozzle at an acute angle in such manner that the driving flow emerging from the nozzle forms a conjoint mixed stream with the suction stream. By virtue of this mixed stream a part-stream from the pump can be fed to a front suction port and a rear suction port, in each case at the same pressure.

Furthermore, from disclosure document DE 10 2021 211 785 A1 a mixing chamber with a suction inlet, a charging inlet, and an outlet is known, wherein the charging inlet opens at an angle along an inner wall in the inside space of the mixing chamber so that within the inside space a mixed flow with a twist is produced.

SUMMARY

The purpose of the present invention is to improve a mixing chamber for producing a pump charge in a fluid pump. In particular, cavitation should be reduced. The objective is achieved by a mixing chamber having the features specified herein. Advantageous embodiments will be apparent from the present disclosure, the description given below and the figures.

A mixing chamber according to the invention for producing a pump charge in a fluid pump comprises an inside space formed by an inner wall of the mixing chamber, a suction inlet that opens into the inside space, which inlet is designed to be connected to a source of fluid and to draw the fluid out of it, a charging inlet that opens into the inside space, which inlet is designed to pass a fluid stream into the inside space and thereby to produce the pump charge, and an outlet leading out of the inside space, which is designed to let the fluid introduced into the inside space out of the mixing chamber, wherein the charging inlet comprises at least a first fluid-guiding section designed as a confuser, a second fluid-guiding section designed as a constriction and a third fluid-guiding section designed as a diffuser, wherein the constriction is located between the confuser and the diffuser and has the smallest diameter in the charging inlet, and the diffuser is formed by a single side surface inclined by an angle relative to a longitudinal axis of the inside space.

In other words, of four side surfaces only one of the side surfaces is inclined by an angle relative to the longitudinal axis of the inside space, and this surface is inclined in such manner that the cross-sectional area of the diffuser increases with increasing axial distance from the constriction. Accordingly, the diffuser has a flow cross-section that increases in the direction toward the inside space. In particular, a side surface counts as inclined by an angle relative to the longitudinal axis of the inside space if the angle is at least greater than 2°. Angles of at most 2° can be produced by manufacturing variables and in particular are within a tolerance range.

The diffuser serves to transform the kinetic energy, which is increased in the confuser, i.e., in the propulsive nozzle, in part back into pressure again due to the non-uniform shape. Owing to the increased pressure in the diffuser, the propulsive jet is deflected in the desired direction and guided optimally into the suction zone. A further part of the kinetic energy of the propulsive jet is used by mixing and pulse compensation with the suction jet in a pressure increase ahead of the pump.

The propulsive nozzle has a flow cross-section that narrows in the direction toward the inside space, in which, downstream from the confuser, are arranged first the constriction and then the diffuser. The constriction can extend over a section with constant diameter, or it can be formed only in one plane. The area upstream from the diffuser, i.e., the constriction, can be designed in different ways. For example, depending on the embodiment the constriction can impose a slight twist of the suction stream along the inner wall. Depending on the embodiment the deflection of the propulsive jet can be increased or reduced. In particular this area can be used for the fine adjustment of the propulsive jet.

By virtue of the design of the charging inlet according to the invention, which consists of the confuser, the constriction and the diffuser, the cavitation rotation speed can be increased and the pump charging thereby improved. The cavitation rotation speed is understood to be that rotation speed above which cavitation in the pump begins. Since the smallest diameter within the charging inlet is arranged between the confuser and the diffuser and the diffuser is formed of a single side surface which is inclined at an angle relative to the longitudinal axis of the inside space, the geometry of the charging inlet, i.e., the geometry of the charging stream line is adapted in flow-technological terms in such manner that the flow energy in the form of displacement energy, i.e., pressure, does not act upon a pump wall or some other component, but supplies the suction ports of the pump in an optimal manner. Thanks to this improved guiding of the charging stream the flow is guided past the pump in the desired direction and is deflected by the radius of the pump nest in the direction toward a second suction port of the pump. This reduces the kinetic energy loss and therefore reduces cavitation. In particular, the pump is configured as a hydraulic vane pump whose delivery rate depends only on its rotation speed.

The suction inlet is designed to be connected to a fluid source and to draw fluid from it. The fluid source is in particular in the form of a fluid reservoir, for example an oil sump. The charging inlet is designed to deliver a targeted fluid stream into the inside space of the mixing chamber and thereby to bring about the pump charging. Thus, the charging inlet serves to pass fluid into the inside space and to support the suction flow present in the inside space by adding kinetic energy. The fluid stream passing into the inside space via the charging inlet is called the charging flow. The outlet is designed to discharge the fluid passing into the inside space out of the mixing chamber again. In particular the outlet leads the fluid again in the direction toward the fluid pump that is to be supported by the pump charging. It can be provided that the pump is connected directly to the mixing chamber, or that a section of a suction duct is arranged between the pump and the mixing chamber.

In a preferred embodiment the side surface in the diffuser that is inclined relative to the longitudinal axis of the inside space is at an angle of at least 10° to at most 45°. Preferably the side surface in the diffuser that is inclined relative to the longitudinal axis of the inside space is at an angle of 20° to 30°. This range of angles has proved particularly suitable for guiding the propulsive stream and also for the partial or unilateral pressure increase and hence for deflecting the propulsive stream. In that way cavitation can be reduced still more. For example, the angle of the side surface in the diffuser that is inclined relative to the longitudinal axis of the inside space is 24°. The longitudinal axis of the inside space is a perpendicular, i.e., a vertical axis through the inside space of the mixing chamber.

According to a preferred embodiment, a quotient of the flow cross-section at the constriction and the flow cross-section at the outlet of the diffuser is at least 0.5 to at most 0.7. Preferably the quotient of the flow cross-section at the constriction and the flow cross-section at the outlet of the diffuser is at least 0.52 and at most 0.6. That range has proved particularly suitable for directing the propulsive flow, so that thereby cavitation can be reduced even more. For example, the ratio of the smallest cross-section in the constriction to the outlet cross-section of the diffuser is 0.56.

In a preferred embodiment the confuser has a curved wall which is designed to deflect the fluid from s radial inlet of the confuser and pass it to the constriction formed transversely thereto. In particular the fluid flows into the confuser radially and is deflected by the curved geometry inside the charging connection to the constriction, i.e., as far as the narrowest flow cross-section. This part serves to increase the flow velocity.

According to a preferred embodiment the charging inlet is made integrally in one piece with the mixing chamber. Thus, the mixing chamber with the charging inlet form one component. In that way the mixing chamber can be made inexpensively. Thereby also, the inside space of the mixing chamber can be shaped in a flow-assisting way so that the flow losses are small. This is favored in that the charging inlet opens along the inner wall of the mixing chamber into the inside space. In particular, the suction inlet and the outlet are parts of the one-piece mixing chamber. Preferably, the mixing chamber is made of plastic and produced by injection-molding. If the mixing chamber is made by an injection-molding process, a further side surface inside the diffuser can be inclined at an angle relative to the longitudinal axis of the inside space in order to optimize the demolding step in the injection-molding process. For example, the further side surface is inclined at an angle of at least 0.25° and at most 2° relative to the longitudinal axis of the inside space.

In a preferred embodiment the mixing chamber also comprises a first all-round seal, which is arranged in an area of the suction inlet on an outer peripheral surface of the mixing chamber, a second all-round seal arranged in an area of the outlet on the outer peripheral surface of the mixing chamber, and a third all-round seal arranged on the outer peripheral surface of the mixing chamber axially between the first and second all-round seals. The first all-round seal is preferably in the form of a lip seal and serves to seal the charging inlet, i.e., the charging flow line. A lip seal is particularly suitable for preventing the escape of a leakage flow that is opposite to the suction direction and therefore one which influences the suction flow adversely. Leakage flows reduce the jet energy and the pump charging. The second and third all-round seals are preferably in the form of O-rings. For example, the third all-round seal is arranged on the outer peripheral surface of the mixing chamber in the area of the diffuser.

According to a preferred embodiment, in the area of the side surface inclined at an angle relative to the longitudinal axis of the mixing chamber the outer wall of the diffuser is positioned so as to deflect the fluid in the inside space. In that way a spoiler effect is produced, whereby the fluid stream can be directed optimally toward the outlet.

A pump device according to the invention for a vehicle transmission comprises a fluid pump for conveying fluid from a pump inlet to a pump outlet and a mixing chamber according to the invention for charging the pump, wherein to produce the pump charge the mixing chamber can be supplied with a fluid flow.

A vehicle according to the invention comprises at least one pump device according to the invention. The above definitions and explanations about technical effects, advantages, and advantageous embodiments of the mixing chamber according to the invention also apply analogously to the pump device according to the invention and to the vehicle according to the invention.

In particular the pump device is in the form of a transmission pump for a vehicle, for example a truck, a passenger car, a powered omnibus, or a railway vehicle. By means of the pump device a transmission oil is delivered as the fluid. The fluid reservoir is then in particular an oil sump of the transmission.

BRIEF DESCRIPTION OF THE DRAWINGS

Advantageous embodiments of the invention, which are explained in what follows, are illustrated in the drawings in which the same or similar elements are denoted by the same indexes, and which show.

DETAILED DESCRIPTION

Figure 1:
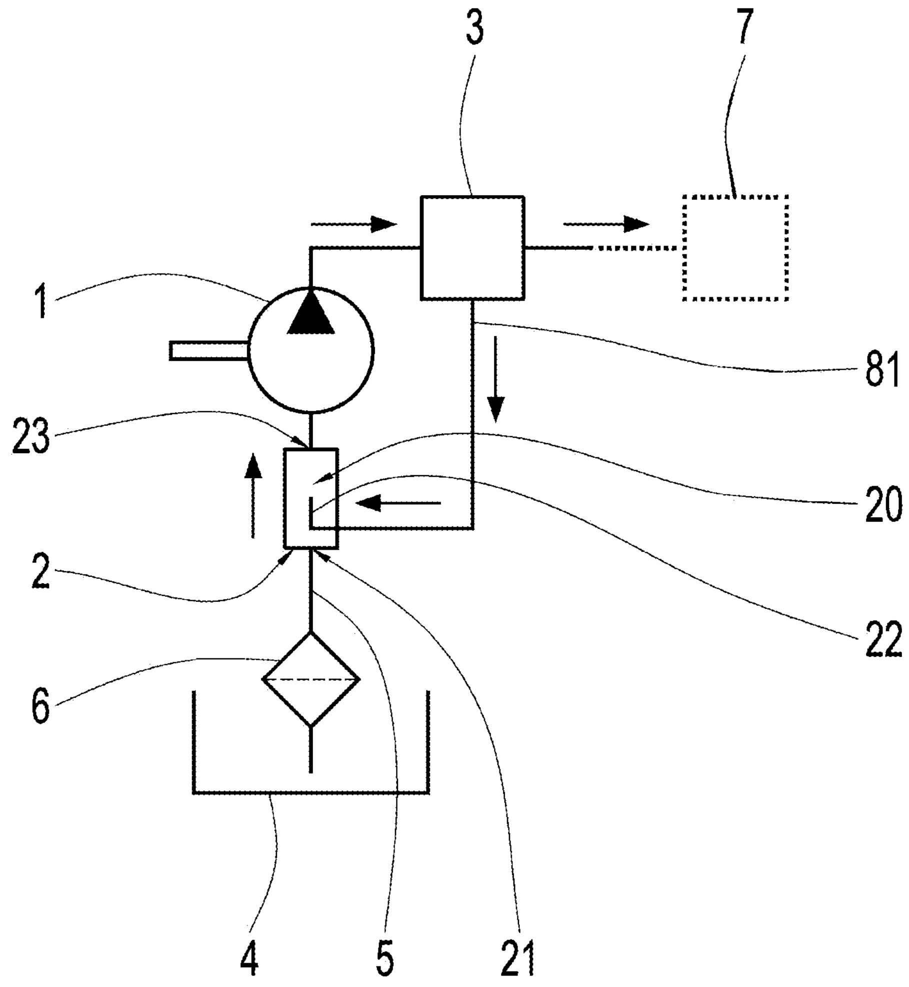
FIG. 1: A highly abstract schematic view of a pump arrangement for a vehicle transmission.

FIG. 1 shows as an example a pump device for producing a hydraulic pressure in a vehicle transmission. Such a pump device can also be used for other applications and also for conveying other fluids. The pump device comprises a fluid pump 1 in the form of a hydraulic pump, and a mixing chamber 2 which is connected upstream from the fluid pump 1 and is provided in order to produce a pump charge. The pump conveys pressurized hydraulic fluid from a fluid source 4 of the transmission in the form of a reservoir to a hydraulic consumer 7 of the transmission. The hydraulic consumer can for example consist of a hydraulic actor and/or a lubrication point in the transmission. For example, with the hydraulic fluid conveyed by the fluid pump 1 shifting elements of the transmission can be actuated in order to shift gears of the transmission.

In the present case the fluid pump 1 delivers a non-adjustable delivery volume and is for example in the form of a vane pump. The delivery volume of the fluid pump 1 depends essentially on the rotation speed of the pump, i.e., the rotation speed at which the fluid pump 1 is driven. High pump rotation speeds increase the risk that cavitation may take place within the fluid pump 1. The fluid pump 1 draws the hydraulic fluid from the fluid source 4 via a suction line 5. The suction line 6 runs through a filter 6 and the mixing chamber 2. Connected downstream from the fluid pump 1 there is a valve 3 by way of which the hydraulic fluid can be led on the one hand in the direction toward the consumer 7 and on the other hand, via the return line 81, back into the mixing chamber 2 in order to produce the pump charge. The valve 3 is in particular in the form of an over-pressure valve. The hydraulic fluid delivered is passed back into the mixing chamber 2 automatically if the hydraulic pressure downstream from the valve 3 exceeds a certain pressure or if not all of the quantity of fluid delivered by the fluid pump 1 is needed. Only the amount of hydraulic fluid not required is so returned. The consumer 7 is supplied at all times with a sufficient delivery quantity at a sufficient pressure.

The concept of pump charging is already known as such, and for that reason it will be explained only briefly in what follows. The mixing chamber has an inside space 20 into which a suction inlet 21 and a charging inlet 22 open. The suction inlet 21 is connected to the fluid source 4 from which it is supplied with hydraulic fluid. The charging inlet 22 is connected to the return line 81 leading back from the valve 3. If necessary, the charging inlet 22 can therefore be supplied with some of the hydraulic fluid conveyed by the fluid pump 1. The outlet 23 of the mixing chamber 2 is connected to the inlet of the fluid pump 1. Thus, the hydraulic fluid drawn from the fluid source 4 passes, via the inlet 22, first into the inside space 20 of the mixing chamber 2. Here, this flow is called the suction flow. In addition, when the valve 3 is appropriately set the pressurized hydraulic fluid passes into the inside space 20 via return line 81 and the charging inlet 22. Here, that flow is called the charging flow. In the inside space 20 the suction flow and the charging flow are mixed with one another, so the charging flow gives up at least some of its kinetic energy to the suction flow. Consequently, the suction flow entering the mixing chamber is accelerated toward the fluid pump 1. That reduces the energy needed by the fluid pump 1 for conveying the hydraulic fluid without having to reduce the rotation speed of the pump. When suction charging is used the efficiency of the fluid pump 1 is improved. The valve 3 is preferably arranged in a valve plate of a hydraulic control unit of the vehicle transmission. The lines shown in FIG. 1 for the hydraulic fluid can be arranged in an associated duct plate and/or the valve plate of the hydraulic control unit. The fluid flows from the mixing chamber 2 to the consumer 7 and from the valve 3 to the mixing chamber 2 are indicated by arrows.

Figure 2:
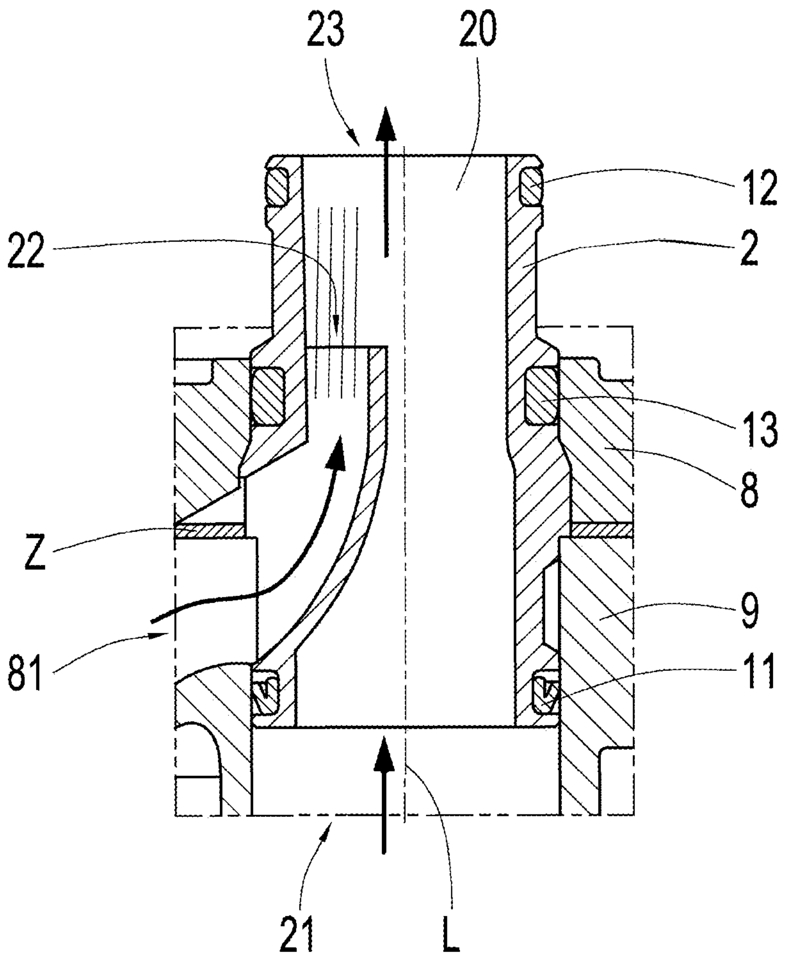
FIG. 2: A schematic sectioned view of a mixing chamber according to the invention.
Figure 3:
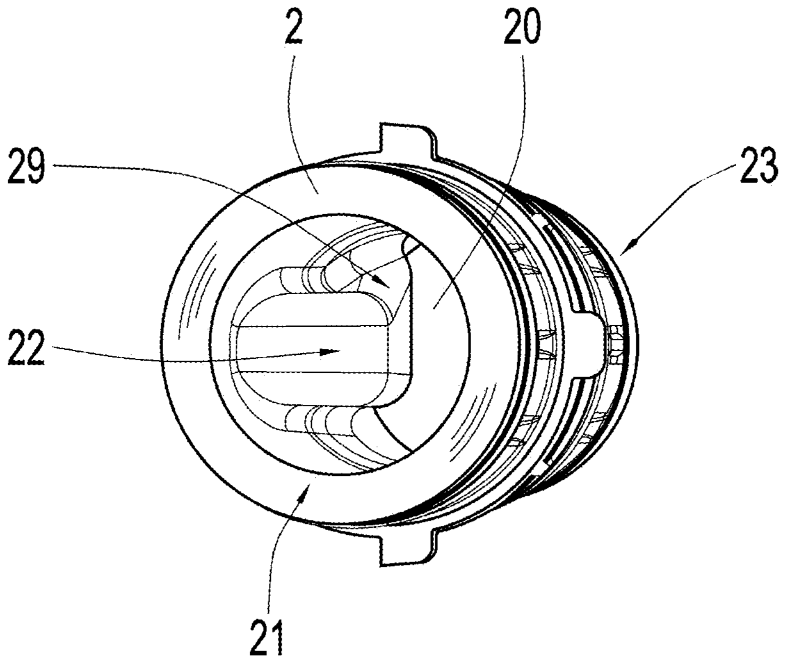
FIG. 3: A schematic perspective representation of the mixing chamber according to the invention.
Figure 4:
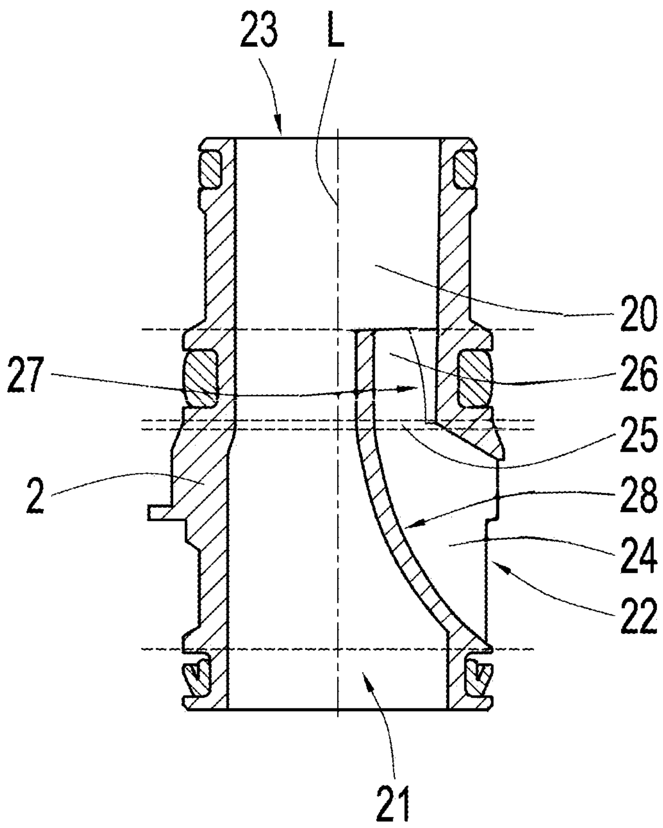
FIG. 4: A further schematic sectioned view of the mixing chamber according to the invention.
Figure 5:
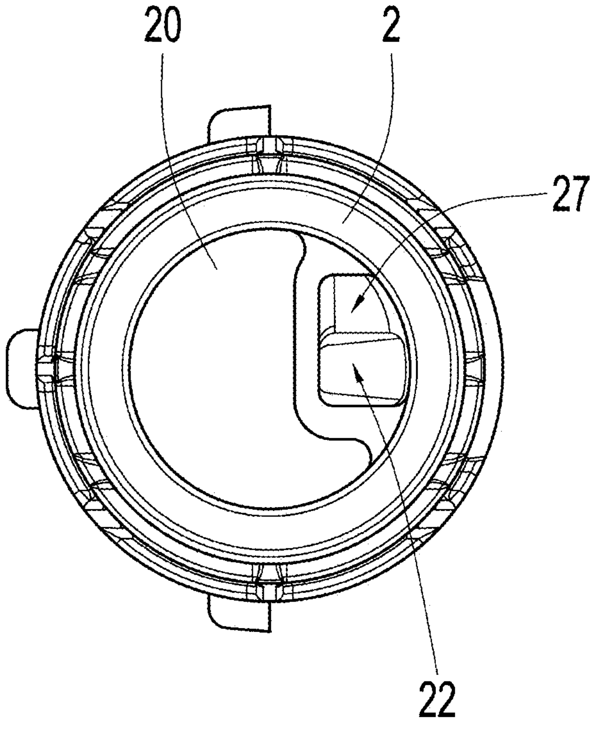
FIG. 5: A schematic view from above, of the mixing chamber according to the invention.
Figure 6:
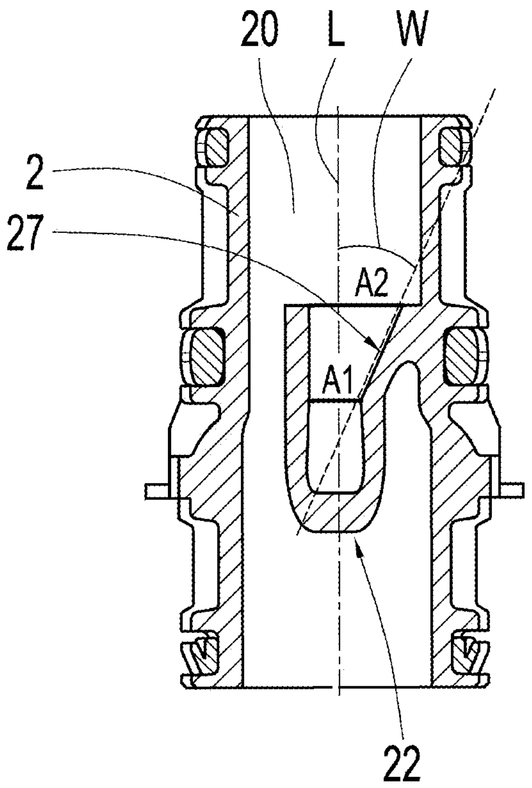
FIG. 6: A further schematic sectioned view of the mixing chamber according to the invention.
Figure 7:
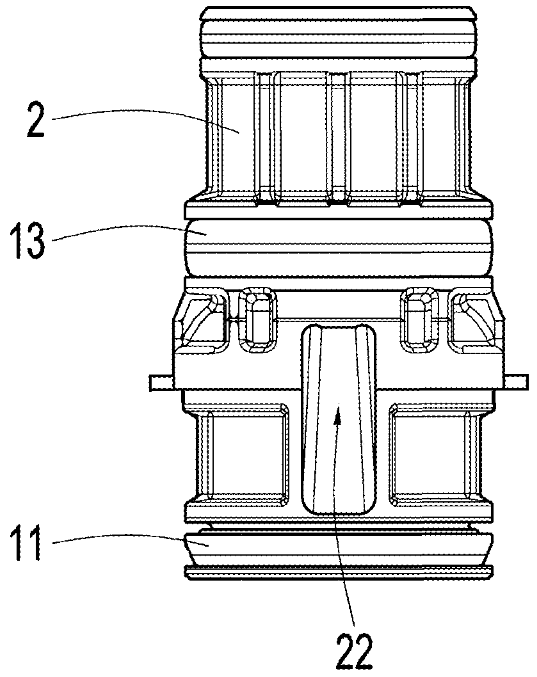
FIG. 7: A schematic side view of the mixing chamber according to the invention.

FIGS. 2 to 7 show various views of the mixing chamber 2 according to the invention as it is used in the pump arrangement of FIG. 1. In FIGS. 2, 4 and 6 the mixing chamber 2 is in each case shown sectioned longitudinally along the longitudinal axis L. In FIG. 5 the mixing chamber 2 is shown as viewed from above. FIG. 3 shows a perspective view of the mixing chamber and FIG. 7 shows a side view of the mixing chamber 2.

The mixing chamber 2 is provided in order to produce a pump charge in the fluid pump 1 shown in FIG. 1, and for that purpose comprises an essentially tubular inside space 20 formed by an inner wall of the mixing chamber 2, a suction inlet 21 that opens into the inside space 20 which inlet is connected to draw fluid from the fluid source 4 in FIG. 1, a charging inlet 22 that opens into the inside space 20, which conveys a fluid stream from the return line 81 into the inside space 20, and an outlet leading out of the inside space 20, which lets the fluid in the inside space 20 out of the mixing chamber 2 and into the fluid pump 1. The suction inlet 21 and the outlet 23 are at opposite ends of the mixing chamber 2, which extends straight along the longitudinal axis L. The inside space also extends straight along the longitudinal axis L.

The outlet 23 and the suction inlet 21 are preferably each in the form of plug-in flanges. In that way the mixing chamber 2 can on the one hand be plugged into a suction duct of the fluid pump 1 and the return line 81 in the duct plate 8 of a hydraulic control unit, and on the other hand into a suction duct of a valve plate 9 of a hydraulic control unit. On the outside of the mixing chamber 2 an at least partially surrounding collar can be provided, by which an axial end-stop for positioning the mixing chamber 2 in its fitted position is formed. The collar can have an axial extension that corresponds to the width of an intermediate sheet Z located between the duct plate 8 and the valve plate 9. In that way the collar and hence the mixing chamber 2 can be fixed in an opening of the intermediate sheet Z between the duct plate 8 and the valve plate 9.

Furthermore, the mixing chamber 2 comprises a first all-round seal 11 which is arranged in the area of the suction inlet 21 on an outside surface of the mixing chamber 2, a second all-round seal 12 arranged in the area of the outlet 23 on the outside surface of the mixing chamber 2, and a third all-round seal 13 arranged axially between the first and second all-round seals 11, 12 on the outside surface of the mixing chamber 2. The first seal 11 is in the form of a lip seal and rests in fluid-sealing contact radially between the mixing chamber 2 and the valve plate 9. The second and third seals 12, 13 are in the form of O-rings. The third seal 13 is in fluid-sealing contact radially between the mixing chamber 2 and the duct plate 8. The fluid flowing into the mixing chamber 2 and out of the mixing chamber 2 is indicated by arrows.

FIG. 3 shows a perspective view of the mixing chamber 2 according to the invention as seen from below, i.e., looking into the suction inlet. The mixing chamber 2 is made in one piece and can be produced in plastic, for example by an injection-molding process. Thus, the suction inlet 21, the charging inlet 22 and the outlet 23 are integral parts of the one-piece mixing chamber 2.

FIG. 4 shows the mixing chamber 2 according to the invention seen along a second longitudinal section, wherein the picture plane of FIG. 4 is rotated by 180° relative to the picture plane of FIG. 2. The charging inlet 22 consists of a first fluid-guiding section 24 in the form of a confuser, a second fluid-guiding section 25 that forms a constriction, and a third fluid-guiding section 26 in the form of a diffuser. The constriction is located between the confuser and the diffuser and has the smallest diameter within the charging inlet 22. For a better understanding the divisions of the charging inlet 22 are indicated by horizontal broken lines. Furthermore, it can be seen in FIG. 4 that the diffuser has a side surface 27 which is inclined at an angle relative to the longitudinal axis L of the inside space 20. The confuser has a curved wall 28 which deflects the fluid from its radial entry into the confuser and guides it to the constriction positioned transversely thereto.

The view of the mixing chamber 2 seen from above, shown in FIG. 5, makes clear the configuration of the charging inlet 22, in particular the diffuser. The charging inlet 22 is made in one piece with the mixing chamber 2. The charging inlet 22 opens along the inner wall of the mixing chamber 2 into the inside space 20. As can be seen particularly well in FIGS. 3 and 5, the inside space 20 of the mixing chamber 2 is shaped to assist flow so that the flow losses are small. The outside wall 29 of the diffuser deflects the fluid flowing into the inside space 20 through the suction inlet 21 in the area of the inclined side surface 27 and gives rise to a spoiler effect.

FIG. 6 shows the mixing chamber 2 according to the invention in a third longitudinal section, wherein the picture plane of FIG. 6 is rotated by 90° relative to the picture plane of FIG. 2 or FIG. 4. In FIG. 6 the structure of the diffuser and the constriction are shown particularly clearly. The side surface 27 inclined relative to the longitudinal axis L of the inside space 20 within the diffuser has an angle W of 24°. Furthermore, a quotient of the flow cross-section A1 at the constriction and the flow cross-section at the outlet of the diffuser is equal to 0.56. By virtue of this structure of the charging inlet 22, a unilateral pressure increase, and optimized guiding of the fluid, in particular a targeted deflection, are achieved. This reduces the cavitation.

FIG. 7 shows a side view of the mixing chamber 2, particularly from the perspective according to FIG. 6. The charging inlet 22 formed in the sidewall of the mixing chamber 2 is located between the first and third seals 11 and 13. In this case, owing to the perspective view only the confuser of the charging inlet 22 can be seen.

INDEXES

1 Fluid pump
2 Mixing chamber
20 Inside space
21 Suction inlet
22 Charging inlet
23 Outlet
24 First fluid-guiding section
25 Second fluid-guiding section
26 Third fluid-guiding section
27 Inclined side surface
28 Curved wall
29 Outer wall of the diffuser
3 Valve
4 Fluid source
5 Suction line
6 Filter
7 Hydraulic consumer
8 Duct plate
9 Valve plate
10 Intermediate sheet
11 First all-round seal
12 Second all-round seal
13 Third all-round seal
A1 Flow cross-section at the constriction
A2 Flow cross-section at the outlet of the diffuser
L Longitudinal axis
W Angle
Z Intermediate sheet

The invention claimed is:

1. A mixing chamber for producing a pump charge in a fluid pump, comprising:

an inner wall of the mixing chamber extending along a longitudinal axis and defining an inside space;

a suction inlet that opens into the inside space, the suction inlet configured to be connected to a fluid source from which it draws fluid;

a charging inlet that opens into the inside space, the charging inlet configured to admit a fluid stream into the inside space and thereby to produce the pump charge; and an outlet leading out of the inside space, the outlet configured to let the fluid present in the inside space out of the mixing chamber;

wherein the charging inlet comprises:

a first fluid-guiding section configured as a confuser having a radial inlet;

a second fluid-guiding section in the form of a constriction; and a third fluid-guiding section configured as a diffuser having an outlet;

wherein the constriction is located between the confuser and the diffuser and has a smallest diameter in the charging inlet;

wherein the diffuser is formed by a side surface inclined at an angle relative to a longitudinal axis of the inside space; and wherein a quotient of the flow cross-section at the constriction and the flow cross-section of the outlet of the diffuser is at least 0.5 and at most 0.7.

2. The mixing chamber according to claim 1 wherein, within the diffuser, the side surface is inclined relative to the longitudinal axis of the inside space at an angle of at least 10° and at most 45°.

3. The mixing chamber according to claim 1, wherein the confuser has a curved wall configured to deflect the fluid from the radial inlet of the confuser and guide it to the constriction extending transversely thereto.

4. The mixing chamber according to claim 1, wherein the charging inlet is made integrally with the mixing chamber.

5. The mixing chamber according to claim 1, further comprising:

a first all-round seal arranged in an area of the suction inlet on an outside surface of the mixing chamber;

a second all-round seal arranged in an area of the outlet on the outside surface of the mixing chamber; and a third all-round seal located axially between the first and second all-round seals on the outside surface of the mixing chamber.

6. The mixing chamber according to claim 5, wherein the first seal is in the form of a lip seal.

7. The mixing chamber according to claim 1, wherein an outer wall of the diffuser is configured to deflect the fluid into the inside space in an area of the inclined side surface.

8. A pump device for a vehicle transmission, comprising:

a fluid pump for conveying fluid from a pump inlet to a pump outlet; and a mixing chamber for charging the pump, wherein, to produce a pump charge, the mixing chamber is configured to be supplied with a fluid stream from the pump outlet and is configured according to claim 1.

9. A vehicle with a transmission, the vehicle comprising: a pump device for the vehicle transmission, the pump device comprising: a fluid pump configured for conveying fluid from a pump inlet to a pump outlet; and the mixing chamber according to claim 1 for charging the fluid pump, wherein, to produce a pump charge, the mixing chamber is configured to be supplied with a fluid stream from the pump outlet.

* * * * *